United States Patent [19]

Hall

[11] Patent Number: 4,627,659

[45] Date of Patent: Dec. 9, 1986

[54] INFANT'S SEAT AND RESTRAINER
[75] Inventor: Dennis E. Hall, Reseda, Calif.
[73] Assignee: T. Ghiglia, Reseda, Calif.
[21] Appl. No.: 731,028
[22] Filed: May 6, 1985
[51] Int. Cl.⁴ .............................................. A47C 31/00
[52] U.S. Cl. ................................... 297/488; 297/485; 297/184; 297/DIG. 3; 297/257
[58] Field of Search ............... 297/257, 488, 184, 484, 297/485, DIG. 3

[56] References Cited

U.S. PATENT DOCUMENTS

| | | | |
|---|---|---|---|
| 921,812 | 5/1909 | Dorf | 297/484 |
| 3,713,695 | 1/1973 | Von Wimmersperg | 297/488 |
| 4,025,111 | 5/1977 | Tanaka et al. | 297/484 X |
| 4,067,608 | 1/1978 | Von Wimmersperg | 297/488 X |
| 4,113,306 | 9/1978 | Von Wimmersperg | 297/216 |
| 4,232,477 | 11/1980 | Lin | 297/DIG. 3 X |
| 4,314,727 | 2/1982 | Potts | 297/184 |
| 4,345,791 | 8/1982 | Bryans et al. | 297/484 |
| 4,500,135 | 2/1985 | Kincheloe | 297/488 X |

FOREIGN PATENT DOCUMENTS 1078724  6/1980  Canada ........................ 297/DIG. 3

Primary Examiner—William Lyddane
Assistant Examiner—José V. Chen
Attorney, Agent, or Firm—Erik M. Arnhem

[57] ABSTRACT

The disclosure relates to an inflatable infant's seat which can be mounted on an automobile seat and secured with an existing standard seat-belt-buckle arrangement. The infant's seat comprises a unitary structure which includes a seat portion, an upright back portion, a canopy portion, and side walls, all being inflatable by way of an air inflator valve. The seat further includes portholes in the side walls for increasing the viewing range of the infant. The standard seat belt is passed through ring openings at the side walls and secured to retain the seat. The infant's seat also includes a harness for restraining the infant. The infant's seat is safe, comfortable, and appealing to the infant.

11 Claims, 3 Drawing Figures

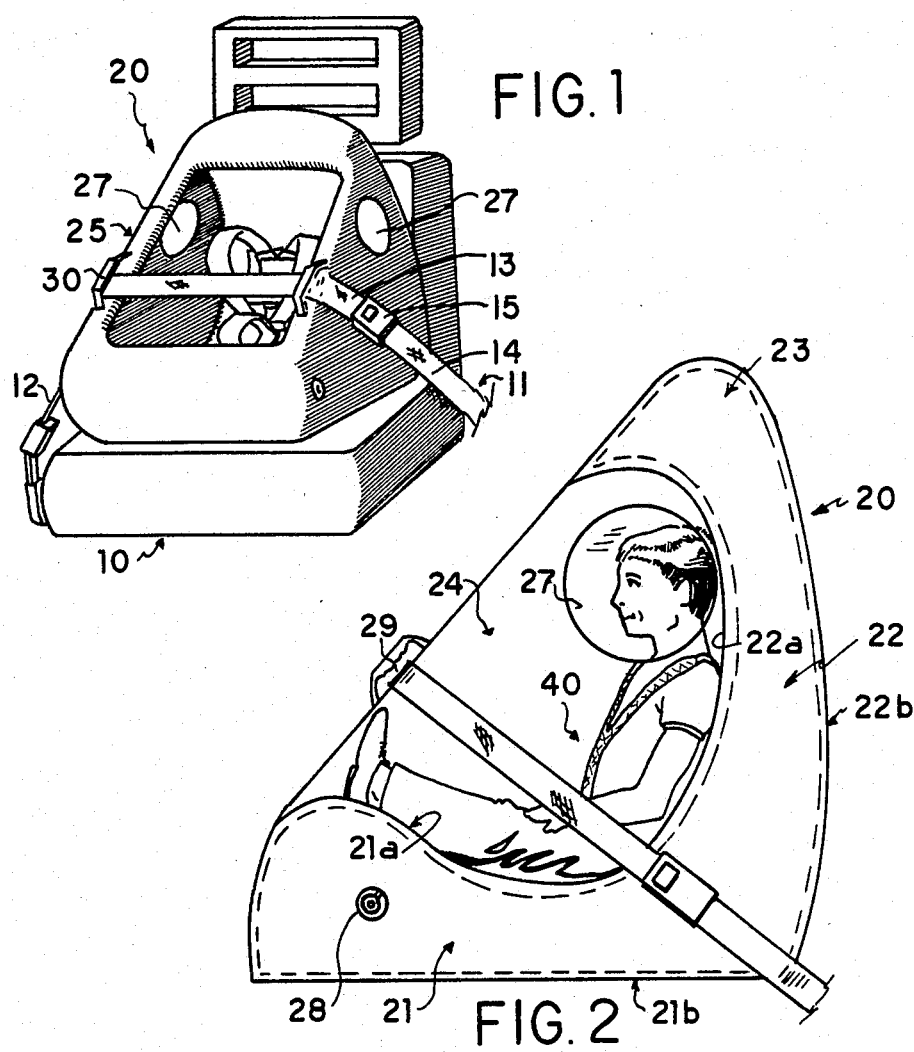
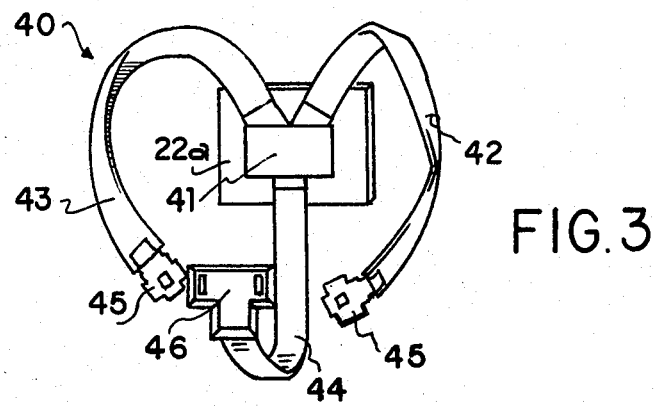

INFANT'S SEAT AND RESTRAINER

BACKGROUND OF THE INVENTION (1) Field of the Invention

My invention relates to a novel infant's seat and restrainer, which is used in conjunction with a standard automobile seat belt, on the seat of an automobile.

The invention is of particular importance for having a small child or infant safely and comfortably seated and restrained, particularly active and restless infants. This situation is especially critical when the driver of the car is alone in the automobile with the infant, and for safety reasons must direct his full attention to the surrounding traffic while using both hands on the steering wheel. This leaves then little room for paying detailed attention to the movements of the infant.

On the other hand, the customary seats and restraining or retaining means are prone to attract the child's attention as to finding ways to release itself, or the infant becomes quickly bored and will then tend to distract the driver.

There has continued to remain, accordingly, the need to provide an infant's seat and restrainer which will accommodate its user in a safe, satisfying, and comfortable manner.

There has also remained the need to provide a seat for an infant which effectively cooperates with the standard, and at times mandatory, seat belt in automobiles, in other motor vehicles, boats, and the like.

SUMMARY OF THE INVENTION

My invention provides an infant's seat and restrainer or similar harness which can be used on the seat of a motor vehicle, and with the standard and/or mandatory seat belt.

The infant's seat is of an unitary structure which includes a lower seat portion, serving to support the legs and lower torso of the infant. The seat also includes a generally upright back portion which serves to support the infant sitting in the upright position. The upper end of the seat includes a canopy portion.

The seat is generally configured as a unitary and rounded, shell-like or bubble-like enclosure having the overall appearance which resembles that of a space seat or space capsule, and having lateral walls in which are provided portholes to increase the viewing range for the infant. The seat belt strap of a lap-type seat belt can be passed through a holding ring or similar opening provided at each side wall of the seat.

It is preferred that the material of construction of the seat is translucent or clear vinyl sheet or similar plastic or synthetic material, which can be readily inflated.

Generally all areas of the seat which are positioned within the viewing rage of the infant using the seat will be made of translucent material.

The seat is further equipped with a restrainer or similar harness to comfortably and safely hold the infant in the seat.

The harness is secured to the outer or forward wall of the back portion of the seat by heat sealing techniques and includes an attachment member, two shoulder straps, and a center strap. The straps are secured by male and female connectors and the like means so as to be locked together when it is intended to secure the infant in the harness.

Included in the objects of the invention are:

To provide a safe and comfortable inflatable seat with restrainer for an infant which seat is easily used on the seat of an automobile or similar vehicle, and which is fully utilizable with the car's seat belt.

To provide a seat which adds to the interest of the infant in being safely retained in its special seat.

To provide an infant's seat with restrainer which seat can be easily inflated.

To provide a seat and harness combination which can be economically manufactured.

BRIEF DESCRIPTION OF THE DRAWINGS

FIG. 1 is a perspective view of the inflated infant's seat with restrainer in accordance with one embodiment of the invention.

FIG. 2 is a side elevation of the embodiment of FIG. 1.

FIG. 3 is a perspective view showing in greater detail the harness component of the infant's seat.

DESCRIPTION OF THE INVENTION

In the drawings like reference characters designate like parts in the several views of the drawings.

The terms "forward", "forwardly", and the like in this specification refer to the direction of travel of the vehicle in which the infant's seat is used. The terms "upright", "upper", and the like indicate the direction towards the ceiling of the respective vehicle.

In FIG. 1, numeral 10 generally indicates the seat of a motor vehicle, not shown, for example, a car. It will be understood, of course, that the infant's seat can equally be used in other motor vehicles, in boats, and the like vehicles which have similar seat and seat belt arrangements.

The seat belt is indicated in its entirety by reference numeral 11. As known, the seat belt 11 has a connector strap 12 with a male connector 13 at its free end. The seat belt 11 also has a buckle end strap 14 with a female connector 15 adapted to secure and release the male connector 13. In the drawings the male connector 13 is shown to be in the secured position.

The infant's seat in its entirety is designated by reference numeral 20. The seat 20 includes a lower seat portion 21, serving to support the legs and lower torso of the infant with its upwardly directed wall 21a. The seat portion also has a downwardly directed wall 21b by means of which the seat 20 is positioned on the seat 10 of the vehicle.

The infant's seat 20 further includes a generally upright back portion 22 which serves to support the infant sitting in the upright position as is indicated in FIG. 2. The back portion 22 is unitarily and contiguously connected to the seat portion 21. The back portion 22 includes a forwardly directed wall 22a and a rearwardly directed wall 22b, and by means of this latter wall 22b the infant's seat 20 is resting against the car seat 10.

The upper end of the seat 20 includes a canopy portion 23 which is contiguously connected to the upright back portion 22.

The entire seat is generally of unitary configuration in the form of a rounded shell-like, bubble-like or conical enclosure, comprised of a seat portion, a back portion, a back portion, and wall portions, i.e. a side wall 24, right-hand side in FIG. 1, and a side wall 25, left-hand side in FIG. 1. Accordingly, the seat configuration will readily suggest to the infant as being seated and protected in a space seat or capsule. To enhance this effect, the seat comprises a transparent section or similar translucent window, generally identified by the reference numeral 27, or a similar lens-shaped viewing section, and which has the appearance of a porthole, in the side wall 24, and another matching window or porthole 27 in side wall 25.

The side walls 24 and 25 as well as the seat portion 21, the upright portion 22, and the canopy portion 23 are respectively contiguously connected and of sufficient rotundity and bulk to safely surround the infant.

The seat 20 is generally fully continuously inflatable as a single unit or inflatable body, by way of an inflator or air inflator valve 28 positioned in the lateral wall of seat portion 21, for example.

The standard seat belt 11 can be passed with the connector end strap 12 through a holding ring, handle opening, or similar passage 29 forming part of the seat 20, i.e. side wall 24, and can pass furthermore through a holding ring, handle opening or similar passage 30 forming, in turn, part of the side wall 25 of seat 20.

The material of construction of the seat 20 is translucent or clear vinyl sheet or similar plastic or synthetic material.

Generally all areas of the seat 20 which are positioned within the viewing range of the infant using the seat will be made of translucent material. In any event, the portholes 26 27 will be made of a transparent material and they are arranged in such a way that the viewing by the infant therethrough is ensured, thereby adding to the interest of the infant to be sitting in the seat 20.

While the seat thus far described will have sufficient seating depth for a small child or infant capable of sitting up, it is nevertheless furthermore contemplated that a retainer or restrainer, designated in its entirety by reference numeral 40 be provided to restrain the infant in the seat 20.

The restrainer or harness 40 is secured to the forwardly directed wall 22a of the back portion 22 of seat 20 by a heat sealing technique, and for this purpose includes an attachment member 41. The attachment member 41 can be secured in various ways to the sheet of material forming the forwardly directed wall 22a of the inflatable back portion 22 of seat 20. Thus, the attachment member 41 may be attached through passages and is then secured or it can be exteriorly secured to the wall 22a. It is only of importance that the attachment member 41 is securely fastened as is ensured by heat sealing techniques.

The location of the attachment member 41 is dictated by the relative size of the infant and will generally be at a point somewhat below the shoulders of the infant. In this context it can be maintained that the overall dimensions of the seat 20 are approximately 20" in height, width, and length.

Two shoulder straps, right shoulder strap 42 and left shoulder strap 43 are placed in m-like fashion over the shoulders of the infant while the center strap 44 is passed substantially circularly about the lower torso and between the legs of the infant from the back to the front. The free ends of the shoulder straps 42 and 43 are provided with male connectors 45, and the free end of the center strap 44 is provided with a cooperating twin-type female connector or buckle 46. The male connectors 45 are of the type that can be slid for securement into the female connector 46 for securing the infant in the harness 40, and the male connectors 45 can be easily removed from the female connector 46 on releasing the respective release thereof.

The material of construction for the straps 42, 43, and 44, as well as the attachment member is webbing of nylon material.

While the foregoing has illustrated and described what is now contemplated to be the best mode of carrying out the invention, the description is, of course, subject to modifications without departing from the spirit and scope of the invention as claimed in the appended claims.

I claim:

1. An infant's seat, said seat being adapted to be inflated and being mountable on an automobile seat in conjunction with an existing standard seat-belt-buckle arrangement, said inflatable seat comprising in combination:

an inflatable seat portion which in its inflated condition with an upwardly directed wall is adapted to support the legs and lower torso of an infant;

an inflatable generally upright back portion unitarily joined to said seat portion and which in its inflated condition with a forwardly directed wall provides support for an infant using the seat in a sitting position;

an inflatable canopy portion unitarily joined to said seat portion to shield the head region of an infant;

upstanding side walls for limiting lateral and allowing sufficient freedom of movement of an infant using the seat; with every side wall having a height which exends between said canopy portion and said seat portion and every side wall being unitarily joined to said seat portion, said back portion, and said canopy;

said seat portion, said upright back portion, said canopy portion, and said side walls being unitarily joined to form a continuously hollow and inflatable structure of open shell configuration of a depth allowing substantially full freedom of movement of the legs and arms of an infant using said seat;

at least one window means in each side wall for increasing the viewing range of an infant;

at least one air inflator valve for inflating and deflating said inflatable structure;

on each side wall an integrally joined ring for passing therethrough a respective seat belt whereby the infant's seat is fixed on the automobile seat in the secured condition of a respective seat belt; and harness means secured to the forwardly directed wall of said back portion, said harness means contributing substantially to the protection of a user in said seat.

2. The infant's seat according to claim 1 wherein said at least one air inflator valve for inflating and deflating said inflatable portions is mounted on said seat portion.

3. The infant's seat according to claim 1 wherein said harness means includes:

at least one attachment member connected to said forwardly directed wall of said back portion;

at least two shoulder straps, with each shoulder strap being connected with one end to said at least one attachment member, and the respective other free end of each shoulder strap having a male connector;

at least one center strap, said at least one center strap being connected with one end to said at least one attachment member and having at its respective free end a female connector;

said at least two shoulder straps having sufficient length to extend from said at least one attachment member at said forwardly directed wall of said back portion over the shoulder of an infant sitting in the infant's seat from the back to the front and being adapted to be engaged with the respective male connector in the female connector of said center strap for securely and comfortably restraining an infant in the seat.

4. The infant's seat according to claim 1 wherein said harness means is heat sealed to said back portion of the seat.

5. The infant's seat according to claim 1 wherein said harness means is made of webbing of nylon material.

6. The infant's seat according to claim 1 wherein said seat portion, said upright back portion, said canopy portion, and said side walls are made of a vinyl-base material.

7. The infant's seat according to claim 6 wherein at least parts thereof are made of a translucent material.

8. The infant's seat according to claim 1 with an overall configuration resembling that of a space capsule.

9. The infant's seat according to claim 1 wherein said window means includes a closed and translucent porthole.

10. The infant's seat according to claim 1 wherein said seat portion, said upright back portion, said canopy portion, and said side walls are made of a plastic material.

11. The infant's seat according to claim 10 wherein said seat portion, said upright back portion, said canopy portion, and said side walls are shaped to present the outline of a space-capsule.

* * * * *